United States Patent [19]
Ostreicher

[11] Patent Number: 4,981,591
[45] Date of Patent: Jan. 1, 1991

[54] CATIONIC CHARGE MODIFIED FILTER MEDIA

[75] Inventor: Eugene A. Ostreicher, Farmington, Conn.

[73] Assignee: Cuno, Incorporated, Meriden, Conn.

[21] Appl. No.: 335,995

[22] Filed: Apr. 7, 1989

[51] Int. Cl.$^5$ ............................................. B01D 39/18
[52] U.S. Cl. ............................... 210/502.1; 162/164.3; 162/164.6; 162/181.6; 162/183; 210/504; 210/505; 210/508
[58] Field of Search ............... 162/164.3, 164.6, 181.6, 162/183; 210/502.1, 503–509

[56] References Cited

U.S. PATENT DOCUMENTS

| | | | |
|---|---|---|---|
| 2,783,894 | 3/1957 | Lovell | 210/203 |
| 3,242,073 | 3/1966 | Guebert et al. | 210/64 |
| 3,408,315 | 10/1968 | Paine | 260/2.5 |
| 4,007,113 | 2/1977 | Ostreicher | 210/504 |
| 4,007,114 | 2/1977 | Ostreicher | 210/504 |
| 4,178,438 | 12/1979 | Hasse et al. | 536/30 |
| 4,230,573 | 10/1980 | Kilty et al. | 210/767 |
| 4,282,261 | 8/1981 | Greene | 426/330.4 |
| 4,288,462 | 9/1981 | Hou et al. | 426/423 |
| 4,305,782 | 12/1981 | Ostreicher et al. | 162/181 C |
| 4,309,247 | 1/1982 | Hou et al. | 162/149 |
| 4,321,288 | 3/1982 | Ostreicher | 427/244 |
| 4,366,068 | 12/1982 | Ostreicher et al. | 210/767 |
| 4,381,239 | 4/1983 | Chibata et al. | 210/679 |
| 4,473,474 | 9/1984 | Ostreicher et al. | 210/636 |
| 4,473,475 | 9/1984 | Barnes, Jr. et al. | 210/638 |
| 4,523,995 | 6/1985 | Pall et al. | 210/504 |
| 4,604,208 | 8/1986 | Chu et al. | 210/636 |
| 4,617,128 | 10/1986 | Ostreicher | 210/679 |
| 4,673,504 | 6/1987 | Ostreicher et al. | 210/500.22 |
| 4,708,803 | 11/1987 | Ostreicher et al. | 210/650 |
| 4,711,793 | 12/1987 | Ostreicher et al. | 427/244 |
| 4,859,340 | 8/1989 | Hou et al. | 210/505 |

OTHER PUBLICATIONS

Carrazone et al., "A New Type of Positively Charged Filter: Preliminary Test Results", Journal of Parenteral Science & Technology, 32:69–74.

Robinson et al (1985), "Depyrogenation by Microporous Membrane Filters", in Technical Report No. 7, Depyrogenation, Parenteral Drug Association, Inc., Philadelphia, Pa.

Mandaro (1987), "Charge-Modified Depth Filters: Cationic-Charged-Modified Nylon Membranes", in Filtration in the Pharmaceutical Industry, T. H. Meltzer, Ed., Marcel Dekker Inc., New York, N.Y.

Meltzer (1987), "Filtrative Particle Removal from Liquids", in Filtration in the Pharmaceutical Industry, T. H. Meltzer Ed., Marcel Dekker, Inc., New York, New York.

The Ultipor® GF ™ and Ultipor® GF ™ Plus Filter Guide, 1981, Pall Corp.

Primary Examiner—Ivars Cintins
Attorney, Agent, or Firm—Weingram & Zall

[57] ABSTRACT

The media comprises cellulosic fiber and silica based particulate or fiber filter elements and a charge modifying amount of a cationic charge modifying system bonded to the surfaces thereof.

A component of the charge modifying system is a primary charge modifying agent characterized as a water soluble organic polymer capable of being adsorbed into the filter elements and having a molecular weight greater than about 1000. Each monomer of the polymer can have at least one epoxide group capable of bonding to the surface of the filter elements and at least one quaternary ammonium group. Preferably, the primary charge modifying agent is a polyamido-polyamine epichlorohydrin resin, a polyamine epichlorohydrin resin, or a resin based upon diallylnitrogen-containing materials reacted with epichlorohydrin. A portion of the epoxy groups on the organic polymer are bonded to the secondary charge modifying agent. This secondary charge modifying agent is an aliphatic polyamine having at least one primary amine or at least two secondary amines.

29 Claims, 5 Drawing Sheets

FIG-4 DYE REMOVAL CHARACTERISTICS

CATIONIC CHARGE MODIFIED FILTER MEDIA

FIELD OF THE INVENTION

This invention relates to charge modified filter media and more particularly to cationic charge modified filter sheet media comprising cellulose fibers and silica based particulate and/or fiber filter elements, said sheet having a high capacity for electrokinetic capture and adsorption of anionic contaminants, particularly at elevated pH's, e.g., up to pH 12, and pyrogen removal.

PRIOR ART

Filtration of fine particle size contaminants from fluids has been accomplished by the use of various porous filter media through which the contaminated fluid is passed. To function as a filter, the media must allow the fluid, commonly water, to pass through, while retaining the particulate contaminant. This retention of contaminant is accomplished by virtue of the operation, within the porous media, of one or both of two distinctly different filtration mechanisms, namely (1) mechanical straining and (2) electrokinetic particle capture and adsorption. In mechanical straining, a particle is removed by physical entrapment when it attempts to pass through a pore smaller than itself. In the case of electrokinetic capture mechanisms, the particle collides with a surface within the porous filter media and is retained on the surface by short range attractive forces.

With the exception of microporous polymeric membranes, the porous filter media known to the art as being suitable for the filtration of fine particle size contaminants, e.g., pyrogens, are comprised of fiber filter elements or a mixture of fiber and particulate filter elements formed into sheet, typically by vacuum felting from an aqueous slurry followed by drying. In a fibrous filter media that depends only upon mechanical straining to hold back particulate contaminants, it is necessary that the pore size of the filter medium be smaller than the particle size of the contaminant to be removed from the fluid. Thus, for removal of fine, submicronic contaminant particles by mechanical straining, the filter media must have correspondingly fine pores, and is typically comprised of small diameter fibers.

As the size of the contaminants sought to be removed by filtration decreases, especially into the submicron range, there developed considerable interest in the use of fine particulate filter elements, such as diatomaceous earth, for use in conjunction with fibers. However, in order to utilize particulate filter elements in a filter media it is necessary to provide a matrix to retain such particulate in the media in order to provide a structure for use. Thus, at least one of the component materials in the filter media sheet must be a long, self-bonding structural fiber, to give the sheet sufficient structural integrity. Unrefined cellulose fibers such as wood pulp, cotton, cellulose acetate or rayon are commonly used.

Asbestos fiber has also been used for filtration of fine or very fine particulate and the use thereof has been welldocumented. The high filtration efficiency of asbestos fibers has been attributed not only to mechanical straining effects but also to the positive zeta potential exhibited by asbestos, which results in the efficient electrokinetic capture of negatively charged contaminant particles. However, because of health considerations, asbestos cannot be used for many applications, particularly in the filtration of pharmaceuticals and parenterals.

Important improvements in filter media and their effectiveness have been achieved with the use of charge modifying systems which modify the surface charge characteristics of a filter media. Charge modifiers are employed to control the zeta potential of the sheet constituents and maximize performance in the electrokinetic capture of small charged contaminants. In practice, cationic charge modifiers are usually employed since most naturally occurring contaminant surfaces are anionic at fluid pH's of practical interest. For example, U.S. Pat. Nos. 4,007,113, 4,007,114, 4,321,288 and 4,617,128 to Ostreicher, describe the use of a melamine formaldehyde cationic colloid to charge modify fibrous and particulate filter elements; U.S. Pat. Nos. 4,305,782 and 4,366,068 to Ostreicher, et al describe the use of an inorganic cationic colloidal silica to charge modify such elements; U.S. Ser. No. 164,797 filed June 30, 1980, to Ostreicher, et al, now abandoned, describes the use of a polyamido-polyamine epichlorohydrin cationic resin to charge modify such filter elements; and U.S. Pat. No. 4,230,573 to Kilty, et al describes the use of polyamine epichlorohydrin to charge modify fibrous filter elements, see also U.S. Pat. Nos. 4,288,462 to Hou, et al and 4,282,261 to Greene. Preferred methods of making the aforedescribed filter media are described in U.S. Pat. No. 4,309,247 to Hou, et al. Cationic charge modified fibrous filter media covered by the aforementioned patents and application are being sold by Cuno, Inc. under the trademark ZETA PLUS. Similar attempts at cationic charging of filter elements were made in U.S. Pat. Nos. 3,242,073 and 3,352,424 to Guebert, et al; and U.S. Pat. No. 4,178,438 to Hasse, et al.

Of particular relevance to this invention is U.S. Pat. No. 4,523,995 to Pall, et al. The patent apparently describes ULTIPOR GF PLUS filters sold by Pall Corporation (Glen Cove, N.Y.). This filter media, in its most relevant and preferred embodiment, is prepared by mixing inorganic microfibers, e.g. glass, with polyamine-epichlorohydrin resin, to form a dispersion, to which a precipitating agent is added to precipitate the resin and coat the microfibers. The preferred precipitating agents are high molecular weight polymers containing anionic charges. The resulting coated microfibers are described as having a positive zeta potential in alkaline media and enhanced particulate removal efficiencies for fine particulate removal, including bacteria and endotoxins (pyrogens). See also, THE ULTIPOR AND ULTIPOR GF PLUS FILTER GUIDE, 1981, Pall Corp.

Carrazone et al, "A New Type of Positively Charged Filter: Preliminary Test Results", Journal of Parenteral Science and Technology, 32:69-74, describes tests on Pall's ULTIPOR GF PLUS filters and states that such filters are effective in microbial removal but only when proteins or negative ions or peptones are not present in the solution. The filter media of this invention, as demonstrated herein, provides effective pyrogen removal in both strong electrolytes and proteinaceous solutions.

Robinson et al (1985), "Depyrogenation by Microporous Membrane Filters", in Technical Report No. 7, Depyrogenation, Parenteral Drug Association, Inc., Philadelphia, Pa.; Mandaro (1987), "Charge Modified Depth Filters: Cationic-Charge Modified Nylon Membranes"; and Meltzer (1987), "Filtrative Particle Removal From Liquids", both in Filtration in the Pharmaceutical Industry, T. H. Meltzer Ed., Marcel Dekker, Inc., New York, N.Y., describe the limitations of prior art cationic charge modified media in terms of general loss of filtration performance at high pH and, more specifically, in Robinson et al the inability of prior art media to achieve useful levels of very fine particle and/or pyrogen removal at high pH. The media of this invention exhibits useful filtration properties at pH values as high as 12.

Cationically charged membranes which are used for the filtration of anionic particulate contaminants are also known in the art. For example, as disclosed in the Assignee's Japanese Patent No. 923649 and French Patent No. 7415733 an isotropic cellulose mixed ester membrane, was treated with a cationic colloidal melamine formaldehyde resin to provide charge functionality. Treatment of the nylon membranes prepared by the methods described in U.S. Pat. No. 2,783,894 to Lovell (1957) and U.S. Pat. No. 3,408,315 to Paine (1968) is suggested therein.

U.S. Pat. No. 4,473,475 and 4,743,418 to Barnes, et al describes a cationic charge modified microporous nylon membrane having bonded thereto, through a cross-linking agent, a charge modifying amount of an aliphatic amine or polyamine, preferably tetraethylene pentamine. The cross-linking agent is an aliphatic polyepoxide having a molecular weight of less than about 500, preferably 1, 4 butanediol diglycidyl ether. Such a membrane exhibits an advantageously low "flush-out" time.

U.S. Pat. Nos. 4,473,474, 4,673,504, 4,708,803 and 4,711,793 to Ostreicher, et al describe, in the preferred embodiment a nylon membrane charge modified with a charge modifying system of an epichlorohydrin modified polyamide having tertiary amine or quaternary ammonium groups, e.g. Hercules R4308, and a secondary charge modifying agent which may be an aliphatic polyamine having at least one primary amine or at least two secondary amines, e.g. tetraethylene pentamine. There is no teaching or suggestion in these patents that such a charge modifying system may be used to produce the filter media of this invention having the unexpected properties described herein.

Cationic charge modified nylon membranes covered by these patents to Ostreicher, et al and Barnes, et al are now being sold by Cuno, Inc., under the trademark ZETAPOR.

U.S. Pat. No. 4,604,208 to Chu, et al describes an anionic charge modified nylon microporous filter membrane. The charge modifying system is a water soluble polymer having substituents thereon capable of bonding to the membrane and anionic functional groups such as carboxyl, phosphorous, phosphonic, sulfonic groups. A cross-linking agent may also be utilized, e.g., aliphatic polyepoxides.

U.S. Pat. No. 4,381,239 to Chibata et al is relevant in that it describes a method for removing pyrogen from a solution by contacting the solution with an adsorbent to adsorb the pyrogen. The adsorbent comprises a water-insoluble carrier and a nitrogen-containing heterocyclic compound of the formula:

R—A—X wherein R is a nitrogen-containing heterocyclic group; A is single bond, alkylene or alkenylene; X is hydrogen or a functional group; and the heterocyclic group and alkylene may be optionally substituted by one or more substituents, and the compound being bonded to the carrier directly or through a spacer. Cellulose is described as a preferred carrier.

OBJECTS AND SUMMARY OF THE INVENTION

An object of this invention is to provide a filter media containing cellulosic fibers and silica based particulate or fiber filter elements having high capacity for electrokinetic capture and adsorption of anionic contaminants, particularly at elevated pHs, e.g. up to pH 12.

Another object of this invention is to provide a filter media capable of endotoxin, e.g. pyrogen, removal from fluids, particularly electrolytes or protein containing fluids.

A further object of the present invention is to provide a new and improved method of producing pyrogen-free water which is readily adapted to large scale production.

A still further object of the present invention is to provide a new and improved method of selectively depyrogenating protein containing fluids.

Another object of this invention is to provide a filter media which exhibits excellent performance for pyrogen removal with greater resistance to performance degradation during multiple autoclaving and/or water washing cycles.

It is still a further object of the present invention to provide charge modified filter media sheets of enhanced filtration performance.

These and other objects of this invention are attained by a novel cationic charge modified filter media. The media comprises cellulosic fiber and silica based particulate or fiber filter elements and a charge modifying amount of a cationic charge modifying system bonded to the surfaces thereof.

A component of the charge modifying system is a primary charge modifying agent characterized as a water soluble organic polymer capable of being adsorbed into the filter elements and having a molecular weight greater than about 1000. Each monomer of the polymer can have at least one epoxide group capable of bonding to the surface of the filter elements and at least one quaternary ammonium group. Preferably, the primary charge modifying agent is a polyamido-polyamine epichlorohydrin resin; a polyamine epichlorohydrin resin, or a resin based upon diallylnitrogen-containing materials reacted with epichlorohydrin. Such resins typically are the reaction product of a polyamine with epichlorohydrin and have quaternary ammonium groups along the polyamine chain as well as epoxide groups capable of bonding to the surfaces of the filter elements.

Another necessary component of the charge modifying system is a secondary charge modifying agent. Preferably a portion of the epoxy groups on the organic polymer are bonded to the secondary charge modifying agent. This secondary charge modifying agent is an aliphatic polyamine having at least one primary amine or at least two secondary amines.

The invention is further directed to a process for cationically charge modifying said filter media by applying to the aforesaid filter elements the aforesaid charge modifying system. Preferably, the process for charge modifying comprises contacting the filter elements with an aqueous solution of the charge modifying system.

The preferred filter media comprises a filter sheet of cellulosic fibrous filter elements and silica based particulate filter elements having bonded thereto a charge modifying system comprising polyamine epichlorohydrin and tetraethylene pentamine.

The filter elements and filter media of this invention have unexpectedly been found to have a high capacity for electrokinetic capture and adsorption of anionic contaminants, particularly at elevated pH's, e.g., up to pH 12. Further, the filter media of this invention has been found to be particularly useful in depyrogenating strong electrolytes and proteinaceous solutions.

DETAILED DESCRIPTION OF THE INVENTION

Figure 1:
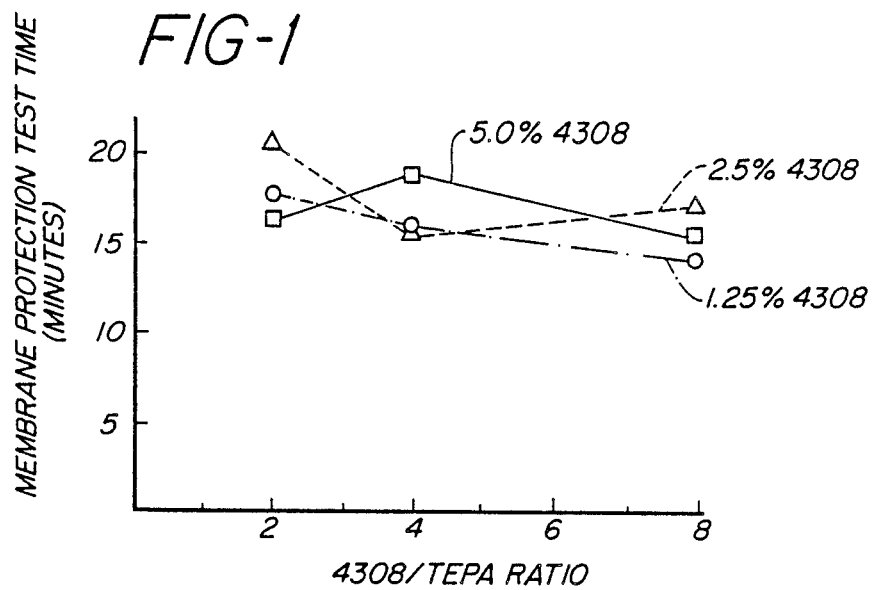
FIG. 1 is a graph of "Membrane Protection Test Time (minutes)" vs. the ratios of the preferred primary and secondary charge modifying agents ("4308/TEPA") (See Examples).

The primary charge modifying agent used in the charge modifying system for this invention may broadly and generally be characterized as a water soluble organic polymer having a molecular weight greater than about 1000, is capable of being adsorbed into the filter elements, and the monomer of the polymer has at least one epoxide substituent capable of bonding to the surface of the filter elements and at least one quaternary ammonium group capable of providing a cationic charge site.

The primary charge modifying agent is adsorbed onto the filter elements and bonded to substantially all of the wetted surfaces of the filter elements, i.e., to substantially all of the microporous microstructure of the subsequently formed filter media.

By the use of the term "bonded" it is meant that the charge modifying agent(s) are sufficiently attached to the filter elements and/or to each other so that they will not significantly extract from the filter media under the intended conditions of use. By the use of the term "substantially all of the wetted surface" as used herein it is meant substantially all of the external surface and internal pore surfaces which are wetted by a fluid passing through the filter media or in which the media is immersed, i.e., substantially all of the microporous microstructure of the filter media.

The preferred primary charge modifying agents are selected from a class of quaternary amine containing cationic resins whose general production and structure are described, for example, in the following U.S. Pat. Nos.: 2,926,116 to Keim: 2,926,154 to Keim: 3,224,986 to Butler, et al; 3,311,594 to Earle, Jr.: 3,332,901 to Keim; 3,382,096 to Boardman; and 3,761,350 to Munjat, et al. The entire disclosures of all of these U.S. patents are incorporated herein by reference.

Broadly, the primary charge modifying agent may be produced by conducting a polymerization of an allyl nitrogencontaining material reacted with epichlorohydrin. Preferred charge modifiers (hereinafter termed "polyamido-polyamine epichlorohydrin or polyamine epichlorohydrin") are produced by reacting a long chain polyamide with epichlorohydrin, i.e. 1-chloro-2,3 epoxypropane having the formula:

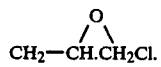

The polyamide may be derived from the reaction of a polyalkylene polyamine and a saturated aliphatic dibasic carboxylic acid containing from about 3 to 10 carbon atoms. The polyamide produced is water soluble and contains the recurring groups:

where n and x are each 2 or more and R is the divalent hydrocarbon radical of the dicarboxylic acid. This polyamide is then reacted with epichlorohydrin to form the preferred water soluble primary charge modifiers used in this invention.

The polyamido-polyamine epichlorohydrin cationic resins are available commercially as Polycup 172, 1884, 2002, or S2064 (Hercules); Cascamide Resin pR-420 (Borden); or Nopcobond 35 (Nopco). Most preferably the preferred polyamine epichlorohydrin resin is Hercules R4308 (hereinafter "4308"), wherein the charged nitrogen atom forms part of a heterocyclic grouping, and is bonded through methylene to a depending, reactive epoxide group.

A secondary charge modifying agent or anchoring agent is used in the charge modifying system to enhance the cationic charge of the primary charge modifying agent and/or enhance the bonding of the primary charge modifying agent to the filter elements and/or the secondary charge modifying agent.

The secondary charge modifying agent used in this invention is an aliphatic polyamine having at least one primary amine or at least two secondary amines.

Preferably, the secondary charge modifying agent is a polyamine having the formula:

wherein $R_1$ and $R_2$ are alkyl of 1 to 4 carbon atoms and x is an integer from 0 to 4. Preferably, $R_1$ and $R_2$ are both ethyl.

Preferred polyamines are:

| | |
|---|---|
| Ethylene diamine | $H_2N-(CH_2)_2-NH_2-NH_2$ |
| Diethylenetriamine | $H_2N-(CH_2)_2-NH-(CH_2)_2-NH_2$ |
| Triethylenetetramine | $H_2N-(CH_2-CH_2-NH)_2-CH_2-CH_2-NH_2$ |
| Tetraethylene pentamine | $H_2N-(CH_2-CH_2-NH)_3-CH_2-CH_2-NH_2$ |

The highly preferred polyamine is tetraethylene pentamine.

The secondary charge modifying agent is essentially bonded to the filter elements by bonding through a portion of the epoxide substituents of the polymeric primary charge modifying agent.

The amount of primary and secondary cationic charge modifying agent utilized in the charge modifying system is an amount sufficient to enhance the electropositive capture potential of the filter media. Such an amount is highly dependent on the specific charge modifying agents utilized and the filter elements Broadly, the process of this invention is directed to cationically charge modifying cellulosic fibrous and siliceous particulate or fiber filter elements which are subsequently formed into a filter media sheet. The process comprises applying to the filter elements a charge modifying amount of a charge modifying system comprising the primary cationic charge modifying agent and the secondary charge modifying agent. The charge modifying system is adsorbed onto the filter elements and bonds to the elements through the epoxide substituents of the primary charge modifying agent, to produce charge modified or surface modified filter elements which are subsequently formed into filter media.

Preferably, the process comprises (a) contacting the filter elements with an aqueous solution of the primary cationic charge modifying agent and (b) contacting the filter elements with an aqueous solution of the secondary charge modifying agent. The contacting steps may be performed in any order, i e. step (a) prior to step (b) or vice versa, or simultaneously, i.e. a mixture of the aqueous solutions is contacted with the filter elements. The filter elements are then vacuum felted and dried to form the filter media.

In order to provide the charge modifying amount of cationic charge system to the filter elements, it is preferred that the aqueous solution of primary charge modifying agent that the filter elements are contacted with contain charge modifying agent sufficient to be at least about 1% of the total weight of the filter elements. The maximum amount of charge modifying agent in the aqueous solution is limited by economic and solubility limitations. For example, an excess of primary charge modifying agent which is not adsorbed into the filter elements may not be economically utilized and might constitute an undesirable extractive from the final filter media. It has been found that the amount of charge modifying agent in the aqueous solution should probably not exceed about 5% by weight of the total weight of the filter elements.

The amount of secondary charge modifying agent used in the aqueous solution is highly dependent on the specific secondary charge modifying agent and the amount and type primary charge modifying agent used, and the cross-linking mechanism between these compounds to provide the bonding of the secondary charge modifying agent to the filter elements. For general guidance however, it has been found that a weight ratio of primary to secondary charge modifying agent of from about 1:1 to about 10:1, with from about 3:1 to about 6:1 in the aqueous solutions contacted with the filter elements, provides sufficient bonding of the cationic charge modifying agents to the filter elements as well as maximum cationic charge modification of the filter elements. It has been found that if the aqueous solution containing the secondary charge modifying agent contains a sufficient amount to provide at least about 0.2% up to a maximum of about 2.5% charge modifying agent of the total weight of the filter elements, when used in conjunction with the aforementioned of primary charge-modifying agent, that adequate bonding of the charge modifying agents to the filter elements is obtained.

The charge modifying system may be contacted with the filter elements by immersing the filter elements in aqueous solutions of the charge modifying agents for a period of time sufficient to effect the desired degree of pick-up. In the preferred embodiment fibrous and particulate filter elements are mixed with an aqueous solution of the charge modifying system, i.e., both primary and secondary charge modifying agent, and a filter sheet media formed by vacuum felting the elements onto a substrate. The sheet is subsequently dried.

Although applicants do not wish to be bound by the following theory, it is believed that in bonding the primary charge modifying agent to the filter elements the epoxide groups on the primary charge modifying agent enter into addition type reactions with the hydroxyl and carboxyl groups which are on the filter elements as well as with the secondary cationic charge modifying agent. For example, the epoxide substituents on the primary charge modifying agent function to (a) cross-link the carboxyl groups on the filter elements to the primary charge modifying agent, (b) cross-link these carboxyl groups to the primary and/or secondary amine groups of the secondary charge modifying agent, and (c) cross-link the primary and/or secondary amines of the secondary charge modifying agent to each other. Due to this extensive cross-linking of the epoxide substituent with various other substituents the final filter media is substantially devoid of epoxide functionality and has a high cationic charge, particularly at high pH's.

Amines are classified as primary, secondary or tertiary, according to the number of substituents attached to the nitrogen atom, i.e. according to the number of hydrogens which have been substituted. Epoxide groups will react with primary and secondary amine groups through the free hydrogens. An epoxide group will not react with a tertiary amine group since there are no free hydrogens.

Amine groups of all three classes, i.e. primary, secondary or tertiary are capable of forming hydrogen bonds with water. As a result, amines of relatively low molecular weight, i.e. short carbon chain length, are quite soluble in water, with borderline solubility in water occurring at about 6 carbon atoms per amine group. In the preferred embodiment of this invention it is highly desirable that the cationic charge modifying agents be soluble in water to provide the desired environment for production of filter media, i.e. elimination of fumes, toxicity, etc.

Amines are basic and generally form salts. The amines are converted into their salts, i.e. charged form, by hydrogen ions and are liberated from their salts by hydroxide ions. It is this latter characteristic, that is undesirable for cationic charge modified media and produces a reduction in adsorptive capacity for anionic contaminants when amine charge modified filter media is exposed to high pHs. It is therefore desirable to use a more basic amine secondary charge modifying agent to produce a filter media having high charge modification and adsorptive capacity for contaminants at a given pH.

It appears, however, that increased cross-linking of the secondary charge modifier with the epoxide substituent increases basicity and filtration effectiveness and thus appears to depend upon the extent to which the primary and secondary amines originally present in, for example, tetraethylene pentamine, are converted to tertiary amines via the reaction with the epoxide.

Preferably, after contacting the filter elements with the charge modifying system, the elements are vacuum felted for a period of time sufficient to remove most of the water and chemical compound not adsorbed into the elements and then dried and cured. Final drying and curing temperatures are preferably from about 120° C. to 140° C. for minimization of drying times without detrimental effects to the media.

The charge-modified media have an improved effective filtration rating relative to untreated media. Such improvement is brought about by charge sites or regions which are effective during filtration to enhance filtration performance through electrokinetic effects, particularly at high pH's, e.g., up to 12.

For so-called sterile filtrations involving biological liquids, the filter media or filter elements are sanitized or sterilized by autoclaving or hot water flushing. The chargemodified media of this invention is resistant to this type treatment, and retains its integrity in use.

The preferred filter media of the present invention is a filter media sheet comprised of filter elements of silica based particulate immobilized in a porous matrix of cellulose fibers. The preferred cellulose fibers are derived from wood pulp. Optionally, cellulose fibers, wherein the cellulose is highly purified alpha-cellulose, provide a filter media, which eliminates false positive tests for pyrogen and is capable of producing filtrates demonstrating very low levels of pyrogen, as tested by the LAL pyrogen test. See U.S. Pat. No. 4,606,824 to Chu, et al incorporated herein by reference.

In the preferred embodiment, in order to provide a matrix which is a coherent and handleable sheet for use, it is desirable that at least one of the components that goes into forming the porous matrix is a long self-binding structural fiber. Such fiber gives the filter sheet media sufficient structural integrity in both the wet "as formed" condition and in the final dried condition. Such a structure permits handling of the filter media during processing and at the time of its intended use. Such fibers are particularly suitable in diameters in the range of 6 to 60 micrometers. Wood pulp, for example, has fiber diameters ranging from 15 to 25 micrometers, and fiber lengths of about 0.85 to about 6.5 mm.

When the amount of particulate immobilized in the porous matrix is low, i.e. less than about 50% by weight of the media, it is preferred that the porous matrix be formed of a self-bonding matrix of normal cellulose pulp having a Canadian Standard Freeness (CSF) of +400 to +800 ml. The state of refinement of wood pulp fibers is determined by means of a "freeness" test in which measurement of the flow rate through the fibers on a standard screen is determined. Two of the most common instruments are the "Canadian Standard Freeness Tester" and the "Shopper-Riegler Freeness Tester". For a more detailed explanation of these tests, see U.S. Pat. No. 4,309,247 to Hou, et al., the entire disclosure of which is incorporated herein by reference. Typical wood pulps show Canadian Standard Freeness values ranging from +400 to +800 ml.

In the preferred embodiment of this invention it is desirable to have a high amount, i.e. greater than about 50% by weight of the filter media, of particulate immobilized in the porous matrix, the remainder being cellulose fiber filter elements. It is thus highly desirable to use the invention described in the aforementioned U.S. Pat. No. 4,309,247 to Hou, et al to maintain such high content of particulate in the filter media. Broadly, a portion of cellulose pulp refined to a Canadian Standard Freeness of between about +100 and −600 ml is incorporated with a portion of the normally dimensioned cellulose pulp (+400 to +800 ml). Generally the weight ratio of unrefined to highly refined pulp will range from about 0.1:1 to about 10:1, preferably 0.2:1 to about 1:1. Such a mixture of pulps permits the retention of fine particulates up to about 80% by weight of the filter media. The higher ratios produce media which are more porous. In any event, it is essential that the cellulose, both refined and unrefined, be a highly pure cellulose. Thus the entire cellulose content of the filtration media comprises a highly pure cellulose, the cellulose with a Canadian Standard Freeness of +400 to +800 ml and the cellulose with a Canadian Standard Freeness of −100 to −600 ml each being highly pure.

Preferably the filter media, and in particular the filter media sheet, is formed by vacuum-felting an aqueous slurry of such normal cellulose fibers, highly refined wood pulp, and particulate with the charge modifying system of primary and secondary charge modifying agent. This forms a charge modified filter media sheet having the particulate immobilized in a porous matrix. The final dried and cured filter media sheet shows a uniformly high porosity and a fine pore-sized structure with excellent filtration flow characteristics.

The amount of particulate in the filter media may be as little as 20% by weight of the filter media up to about 80% by weight. Generally, levels of about 50 to 70% by weight are employed. Various types of siliceous particulate are suitable for inclusion in the filter media of this invention, including diatomaceous earth, perlite, talc, silica gel, clay, etc. Functionally, the fine particulate should have a specific surface area in excess of one square meter/gram and/or particle diameters of less than 10 microns. In a broad sense, any fine particulate may be suitable, such as J.M. Filter Cel, Standard Super Cel, Celite 512, Hydro Super Cel, Speed Plus and Speed Flow; Dicalite 215 and Dicalite 416 and Dicalite 436, and may be evaluated by techniques well-known to the art. The finer grades of diatomaceous earth, perlite, for example in proportion by weight of from about 80/20 to 20/80, give better filtration performance or better cost-performance characteristics than that achieved by the use of any single type siliceous material. Similarly, mixtures in all proportions of relatively coarse and fine particulates, e.g., 50/50 parts by weight of 10 and 5 micron diameter particulates may be used. Siliceous fibers, e.g., glass fibers, may also be used either alone or admixed with the particulate.

In one embodiment herein, at least some of the particulate material may be "micro-particulate", i.e., has on the average a diameter of less than one micron, (a Gaussian distribution of particle diameters), preferably less than 100 millimicrons, most preferred less than 50 millimicrons, especially between 1 and 25 millimicrons. The micro-particulate is preferably fumed silica or fumed alumina; see U.S. Pat. No. 4,511,473 to Hou, et al, the entire disclosure of which is incorporated herein by reference.

In another embodiment, the cellulose-containing separation media contains, as at least a portion of the particulate, activated carbon particles. The carbon particles have an average diameter of less than about 50 microns; see U.S. Pat. No. 4,404,285 to Hou the entire disclosure of which is incorporated herein by reference.

The sequence of adding the required components to water to form the dispersed slurry of filter elements and cationic charge modifying system appears to be relatively unimportant provided that the slurry is subjected to hydrodynamic shear forces during the mixing process. Preferably, the charge modifying system is added last. Preferably, refined pulp is added to a slurry of unrefined pulp and then the particulate incorporated in the slurry. The slurry is normally prepared at about 4% consistency, i.e., weight percent solids, and then diluted with additional water to the proper consistency required for vacuumfelting sheet formation. This latter consistency value will vary depending upon the type of equipment used to form the sheet. Typically, the slurry is vacuum-formed into a sheet and oven dried in a standard manner. The preferred filter media in sheet form has a thickness of about 0.100 inches (0.25 cm) to about 0.200 inches (0.50 cm) and/or a weight of about 0.7 to 1.3 gm/sq.inch, and most preferably about 1.0 gm/sq.inch.

The process conditions are not critical as long as the charge-modifying system is permitted to contact the filter elements contained in the slurry. The amounts of the dispersion medium, e.g. water, do not seem to be critical. The time required for charge modification of the surface and adsorption into the filter elements does not appear critical and appears to occur instantaneously, with about 0.5 to about 20 minutes being adequate for most purposes Of course, longer periods of exposure, e.g. up to several hours, can be used to assure relatively complete adsorption, bonding and deposition of the charge modifying system. A period of about 15 minutes up to two hours is typical.

The amount of charge-modifying system added to the filter material is not critical but is merely a matter of functionality. For example, a high surface area filter elements may require more charge-modifying system for optimum filtration than one of lower surface area. Nevertheless as the chargemodifying system is adsorbed into the filter elements and deposited on the surfaces thereof, the filtration efficiency is enhanced, so that even small amounts are effective.

The liquid medium for the present process is a polar medium, advantageously an aqueous medium as mentioned hereinbefore. Water is the simplest, most adequate and most economical and therefore is preferred.

The filter media of this invention are free of extractables and free of discoloration, such that the sheets are usable under any sterilizing conditions and may be employed safely and effectively with potables or ingestables such as food or drugs. Additionally, such filter media has an unexpectedly high capability for removing pyrogen from fluids, particularly electrolytes and proteinaceous solutions, as well as maintaining filtration effectiveness at high pH's, e.g., up to about 12.

Figure 5:
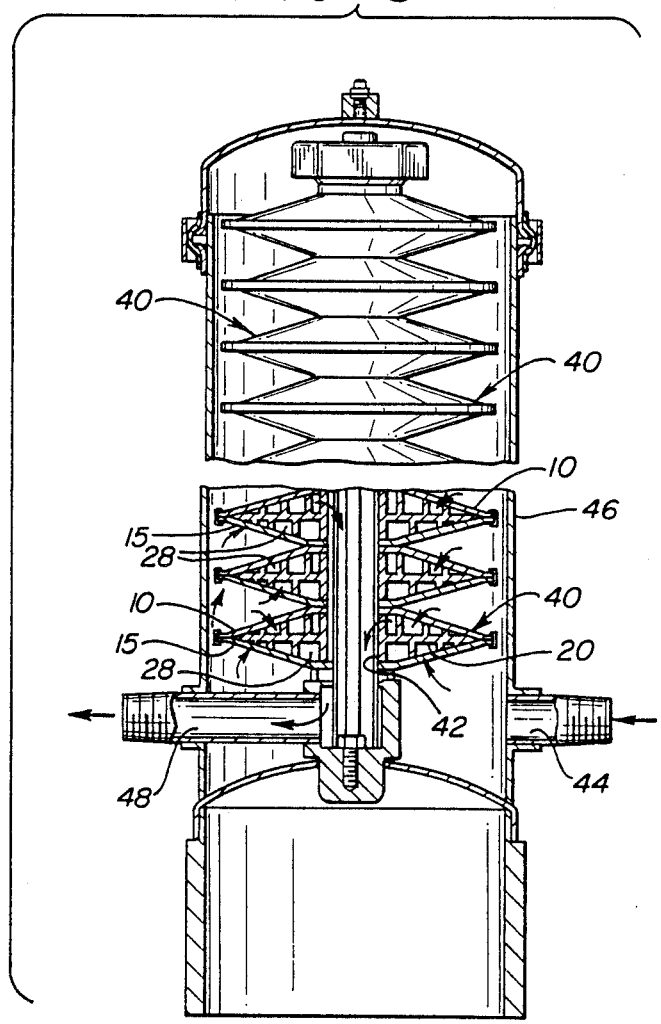
FIG. 5 is a longitudinal partial cross-sectional view of a preferred embodiment of a filter housing and filter cartridge comprised of a plurality of filter cells utilizing the filter media sheet of this invention.
Figure 6:
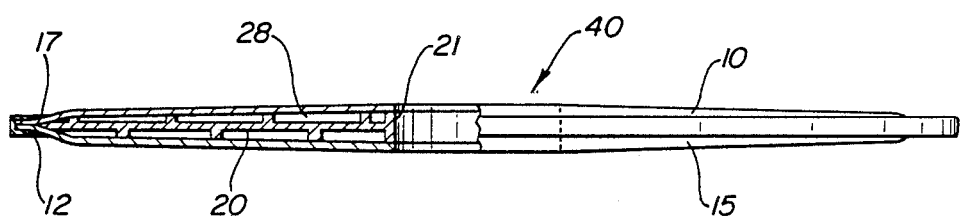
FIG. 6 is a cross-sectional view of an individual filter cell of the filter cartridge of FIG. 5.

A preferred form of utilizing the filter media of this invention is to incorporate the filter media in sheet form in a filter cell which is used to form a filter cartridge. Such filter cartridges are of the type sold by Cuno under the trademark ZETA PLUS. FIGS. 5 and 6 depict, respectively, such a filter cartridge and housing, and the filter cell Referring to FIGS. 5 and 6, the filter cell 40 is comprised of two filter media 10 and 15, preferably in disc form having the flanges 12 and 17 in intimate face-to-face contact with each other, the filter media 10 and 15 and spacer means 20 all having an axial or central opening 21 of the proper size which forms a vertical conduit 42.

In operation the fluid is filtered by passing through in-take pipe 44 into a housing 46. The fluid passes from the outside of the filter cell 40 through the filter media 10 and 15 to the space 28 formed by spacer means 20. Contaminants, e.g. insolubles and microorganisms, are deposited on the outside and/or within the filter media 10 and 15 and the filtrate discharged through the discharge tube 48. Discharge tube 48 is in fluid connection with vertical conduit 42 which is in fluid connection with space 28 between the media 10 and 15.

Several embodiments of this form of filter cell and cartridges are described in U.S. Pat. No. 4,347,208 to K. Southall; 4,783,262 to Ostreicher, et al: 4,606,824 to Chu. et al; and 4,704,207 to Chu. The entire disclosures of these patents are incorporated herein by reference.

The filter sheet media of this invention is particularly useful in adsorbing and capturing anionic contaminants at high pH's, e.g., up to about 12, and pyrogen removal.

EXAMPLE I

All of the filter medium samples in this EXAMPLE I were prepared from a basic fibre/particulate formulation consisting of the following components:

| | |
|---|---|
| WEYERHAUSER KAMLOOPS KRAFT WOOD PULP | 23.6 WT. PERCENT |
| REFINED (−250 CSF) KAMLOOPS WOOD PULP | 6.4 WT. PERCENT |
| GREFCO DICALITE TYPE 436 PERLITE | 70.0 WT. PERCENT |

The above listed components were sequentially added to water, with agitation, to produce a 4.0 weight percent dispersion. As specified in Table 1, the dispersion pH was either left "as-is" or was adjusted upward to pH 8.0. As further specified in Table 1, varying amounts of the primary charge modifier (Hercules PAE Resin 4308) and secondary charge modifier (Tetraethylene Pentamine) were sequentially added to the fiber/particulate dispersion with agitation, i.e., the primary charge modifier was added first and given time (approximately 15 minutes) to adsorb onto the surfaces of the fiber and particulate in the dispersion, then the secondary charge modifier was added. After approximately an additional 15 minutes, the dispersion was diluted to 2.0 weight percent consistency. The final dispersion pH was either left "as-is" or adjusted downward to pH 7.0 as specified in Table 1.

The samples identified as "30S CONT", i.e., Control, utilized 2.0 weight percent of Hercules Polycup 1884 in place of the primary and secondary charge modifiers mentioned above. As such, the "30S CONT" samples represent the commercially sold filter sheet medium ZETA PLUS manufactured and sold by the Assignee herein using the prior art charge modifier system described in U.S. Ser. No. 186,695, now U.S. Pat. No. 4,859,340 to Hou et al.

Each dispersion was then independently formed into an approximately 24 inch square sheet filter medium by means of vacuum dewatering in a foraminous former followed by drying on a moving belt in a hot air tunnel oven. The resulting sheet filter medium samples had specific weights of approximately 0.75 grams per square inch and a thickness of approximately 0.15 inches.

Each sample filter medium was subjected to a series of three different contaminant removal tests intended to define the electrokinetic capture and adsorption characteristics over a range of anionic particle sizes extending from a maximum of approximately 1.0 micrometer (Hyplar Membrane Protection Test) down to a minimum of approximately 100 Angstroms (Metanil Yellow Dye Test) and including an intermediate particle size of 0.11 micrometers (Monodisperse Latex Test). The test procedures utilized were as follows:

Membrane Protection Test

In this test, a 118 mm diameter disc of the medium sample is installed in a test housing which seals the outside edge of the medium and allows for pressurized flow of the challenge contaminant dispersion through the medium sample. In series with this test housing, and downstream of it, is another housing containing a 47 mm diameter 0.2 micrometer membrane filter. The test contaminant is Grumbacher Hyplar polydisperse acrylic latex (average particle size=0.7 um) dispersed in filtered distilled water to give a turbidity of 50 NTU as measured by a Hach Model 2100A Turbidimeter. The pH of the contaminant dispersion is adjusted to 5.0 with HCl and the resistivity is adjusted with NaCl to a value of 22,000 ohms. The resulting contaminant dispersion is passed through the test medium sample at a constant flow rate of 225 ml/min. The resulting pressure drop across the test medium sample and across the downstream membrane are separately monitored and recorded as a function of time. The test is terminated when the pressure drop across the membrane increases by a value of 5.0 PSID above the initial "clean" pressure drop. In those cases where that contaminant breaks through the sample medium and the membrane plugs, the total elapsed time is a measure of the electrokinetic capture and adsorption capacity of the medium sample for the anionic Hyplar test contaminant.

Monodisperse Latex Test

In this test, a 47 mm diameter disc of the sample medium is installed in a test housing which seals the outside edge of the medium and allows for pressurized flow of the challenge contaminant dispersion through the medium sample. The test contaminant is Dow Diagnostics 0.109um Monodisperse Latex at a concentration which gives a turbidity of 10 NTU as measured by a Hach Model 2100A Turbidimeter. The pH of the dispersion is adjusted to 7.0 with NaOH and the resistivity is adjusted with NaCl to a value of 22,000 ohms. The resulting contaminant dispersion is passed through the test medium sample at a constant flow rate of 56 ml/min. The pressure drop across the test medium sample, and the effluent turbidity (measured by the Hach Model 2100A Turbidimeter) are continuously monitored and recorded as a function of time. The test is terminated when the effluent turbidity increases to a value of 5.0 NTU. The total elapsed time is a measure of the electrokinetic capture and adsorption capacity of the medium sample for the anionic 0.109 um Monodisperse Latex Contaminant.

Metanil Yellow Dye Test

In this test, a 47 mm diameter disc of the sample medium is installed in a test housing which seals the outside edge of the medium and allows for pressurized flow of the challenge contaminant solution through the medium sample. The test contaminant is Metanil Yellow dye (Molecular Wt. $\approx$ 108) at a concentration of 3 ppm giving a transmittance of $\approx$ 50 percent as measured at a wavelength of 430 nm using a Coleman 295 Spectrophotometer. The pH of the dispersion is adjusted to pH 7.0 with NaOH and the resistivity is adjusted with NaCl to a value of 22,000 ohms. The resulting contaminant dispersion is passed through the test medium sample at a constant flow rate of 56 ml/min. The pressure drop across the test medium sample, and the effluent transmittance is continuously monitored, as a function of time, using the Coleman 295 Spectrophotometer at a wavelength of 430 nm. The test is terminated when contaminant breakthrough occurs, i.e., the effluent transmittance decreases to a value of 85 percent, or when the pressure drop across the sample medium increases by a value of 5.0 PSID above the initial pressure drop. When the test is terminated because of contaminant breakthrough, the total elapsed time is a measure of the electrokinetic capture and adsorption capacity of the medium sample for the anionic Metanil Yellow Dye.

The results of the EXAMPLE I study are summarized in Table 1.

TABLE I

| | FORMULATION WITH 4308 - TEPA CHARGE MODIFIER SYSTEM | | | | | | |
|---|---|---|---|---|---|---|---|
| SAMPLE DESIG. | 4308 (%) | TEPA (%) | INITIAL pH | FINAL pH | MEMBRANE PROTECTION (Min.) | 0.109 μm MDL TEST TIME (Min.) | METANIL YELLOW TEST TIME (Min.) |
| 30S CONT | — | — | — | — | 19.3 | 46.0 | 7.4 |
| 30S CONT | — | — | — | — | — | 43.8 | 6.2 |
| 30S-1 | 2.500 | 0.625 | 6.94 (as is) | 9.60 (as is) | 19.9 | 60.0 | 67.5 |
| 30S-2 | 2.500 | 0.625 | 8.70 (adj.) | 9.60 (as is) | 15.6 | 66.5 | 69.3 |
| 30S-3 | 2.500 | 0.625 | 6.94 (as is) | 7.06 (adj.) | 14.6 | 66.8 | 72.5 |
| 30S-4 | 2.500 | 0.625 | 7.91 (adj.) | 6.91 (adj.) | 15.7 | 74.5 | 78.0 |
| 30S-5 | 2.500 | — | 7.02 (as is) | 5.58 (as is) | 18.9 | 71.8 | 44.5 |
| 30S-6 | 2.500 | — | 6.87 (as is) | 7.08 (adj.) | 21.4 | 62.9 | 44.8 |
| 30S-7 | 2.500 | — | 7.92 (adj.) | 6.00 (as is) | 20.0 | 77.0 | 38.2 |
| 30S-8 | 2.500 | — | 8.25 (adj.) | 6.95 (adj.) | 19.0 | 63.3 | 50.0 |
| 30S-9 | 1.250 | 0.625 | 7.90 (adj.) | 8.50 (as is) | 16.2 | 52.5 | 36.2 |
| 30S-10 | 1.250 | 0.312 | 8.23 (adj.) | 8.34 (as is) | 18.9 | 64.6 | 40.0 |
| 30S-11 | 1.250 | 0.156 | 8.15 (adj.) | 7.43 (as is) | 15.2 | 36.1 | 31.0 |
| 30S-13 | 2.500 | 1.250 | 8.25 (adj.) | 8.54 (as is) | 22.4 | 48.8 | 53.0 |
| 30S-2R | 2.500 | 0.625 | 8.70 (adj.) | 9.60 (as is) | 15.6 | 66.5 | 69.3 |
| 30S-14 | 2.500 | 0.312 | 8.03 (adj.) | 7.95 (as is) | 17.1 | 42.5 | 53.0 |
| 30S-16 | 5.000 | 2.500 | 8.50 (adj.) | 9.04 (as is) | 17.9 | 48.8 | 93.0 |
| 30S-17 | 5.000 | 1.250 | 8.20 (adj.) | 9.09 (as is) | 16.0 | 63.5 | 79.5 |

TABLE I-continued

FORMULATION WITH 4308 - TEPA CHARGE MODIFIER SYSTEM

| SAMPLE DESIG. | 4308 (%) | TEPA (%) | INITIAL pH | FINAL pH | MEMBRANE PROTECTION (Min.) | 0.109 μm MDL TEST TIME (Min.) | METANIL YELLOW TEST TIME (Min.) |
|---|---|---|---|---|---|---|---|
| 30S-18 | 5.000 | 0.625 | 8.12 (adj.) | 8.30 (as is) | 14.1 | 37.5 | 69.0 |

Figure 2:
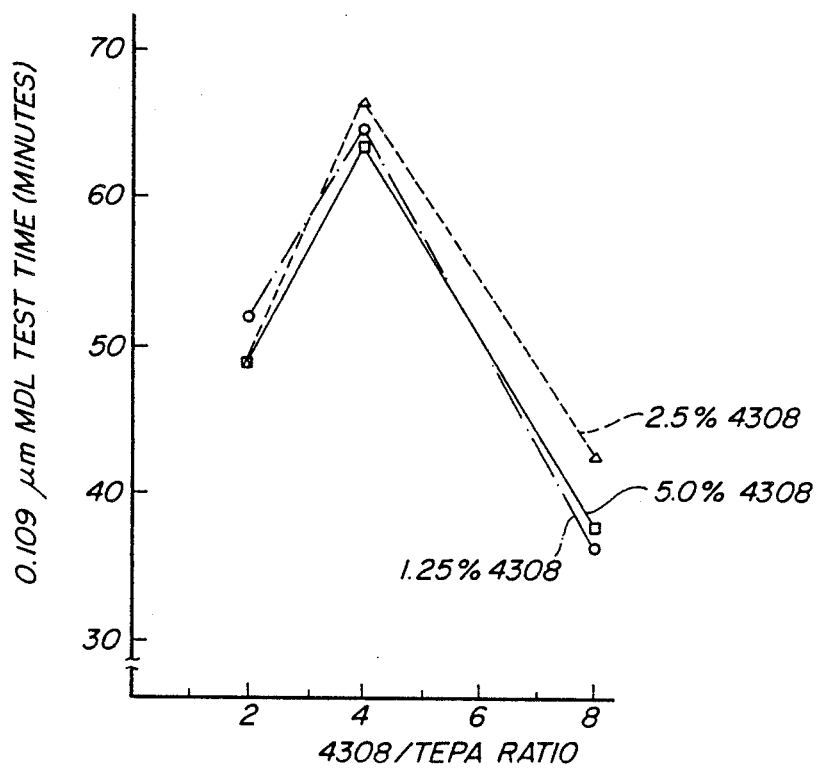
FIG. 2 is a graph of "0.109 micron MDL Test Time (minutes)" vs. "4308/TEPA Ratio" (See Examples).
Figure 3:
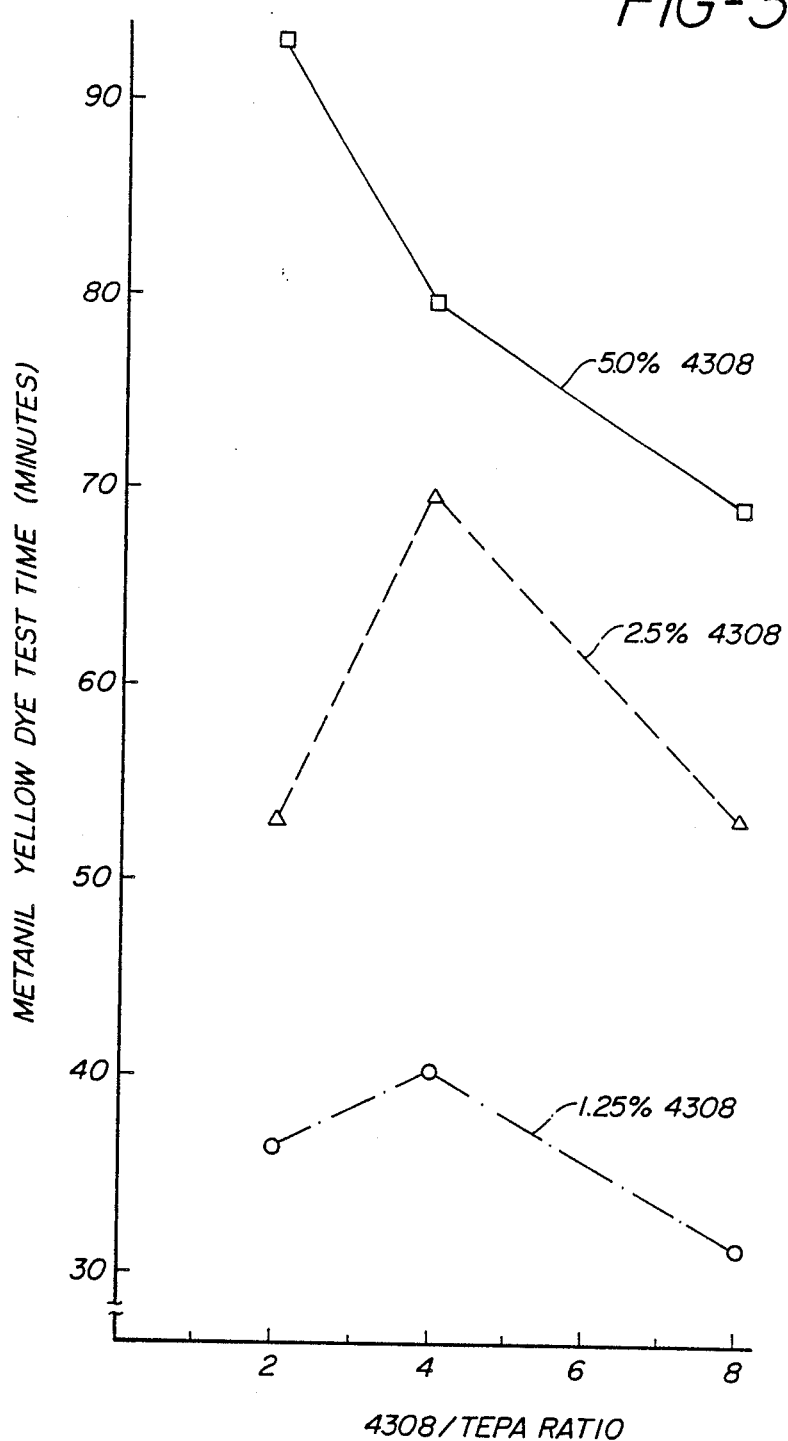
FIG. 3 is a graph of "Metanil Yellow Dye Test Time (minutes)" vs. "4308/TEPA Ratio" (See Examples).
Figure 4:
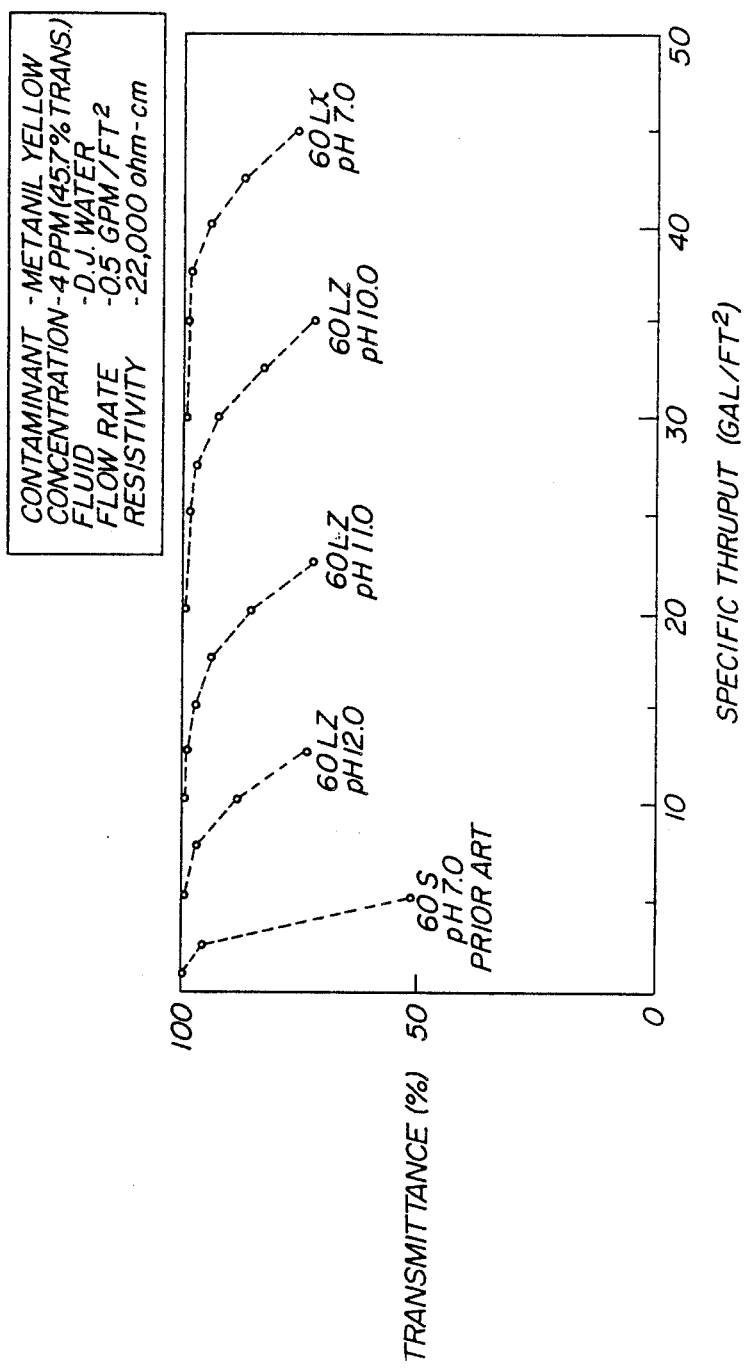
FIG. 4 is a graph of "Transmittance (%)" vs. "Specific Thruput (Gal/ft$^2$)" demonstrating Dye Removal Characteristics of the filter of this invention compared to the Prior Art (See Examples).

A number of significant conclusions can be drawn from the test results summarized in Table 1 and as shown in FIGS. 1, 2 and 3.

1. As shown in the Membrane Protection Test, there is no significant difference between the prior art samples and the samples of the invention in terms of electrokinetic capture and adsorption capacities for the larger Hyplar contaminant particles. In the samples of the invention, the total charge modifier content and primary to secondary charge modifier ratio (see FIG. 1), or pH history of the media samples do not seem to have any effect on capacity.

2. As shown in the Monodisperse Latex Test, the samples of the invention do appear to have an increased capacity (approximately 50%) for the electrokinetic capture and adsorption of the smaller monodisperse latex particles in comparison to the prior art samples. However, this effect is also demonstrated when the primary charge modifier of the invention is used by itself and it is possible that the enhanced monodisperse latex capacity is due to the differences in charge density between the 1884 and 4308 PAE resins. The results from samples 30S - 9 through 30S - 18 (see FIG. 2) do show that the ratio of primary to secondary charge modifier does have a significant effect upon the monodisperse latex capacity with a maximum benefit being achieved at an intermediate value of 4:1. On the other hand, the total charge modifier content and pH history of the media did not seem to have any effect.

3. As shown in the Metanil Yellow Dye Test, the samples of the invention do exhibit radically enhanced electrokinetic capture and adsorption capacities for the very small Metanil Yellow particle in comparison to the prior art samples, and a significantly increased capacity compared to those samples using only the primary charge modifier. The results from samples 30S - 9 through 30S - 18 (see FIG. 3) do show that the primary to secondary charge modifier content does have a significant effect on the Metanil Yellow Dye capacity which again, as previously shown for the monodisperse latex, appears to achieve a maximum value at an intermediate ratio of 4:1. In addition, it is shown that the total charge modifier content has a direct proportional effect on the capacity. Again, the pH history does not seem to have any significant effect.

EXAMPLE II

In EXAMPLE I, the basic fiber/particulate formulation was that of the prior art ZETA PLUS 30S Grade filter medium. It was chosen because it typically produced a filter medium whose pores were large enough not to mechanically strain out the Hyplar, or smaller, particles. As such, all of the particle removal exhibited by the control and sample media was due solely to electrokinetic capture and adsorption. In this example, it was our purpose to compare the electrokinetic capture and adsorption characteristics of the 4308/TEPA charge modifier system, representative of the invention, to that of the previously identified prior art system, in media with finer pore sizes. The sample formulations used in this example are given in Table 2.

TABLE 2

The following formulations of filter sheet media were made

| SAMPLE DESIG. | PULP CONTENT (TYPE & WEIGHT %) | REFINED PULP CONTENT (FREENESS & WEIGHT %) | PARTICULATE CONTENT (TYPE & WEIGHT %) | CHARGE MODIFIER CONTENT (TYPE & WEIGHT %) |
|---|---|---|---|---|
| 90 S CONTROL | KAMLOOPS - 19.0 | −250 CSF, 11.0 | 215 DE, 35.0<br>416 PERLITE, 35.0 | 1884 PAE, 2.0 |
| 90 S-1A, B, C | KAMLOOPS - 19.0 | −250 CSF, 11.0 | 215 DE, 35.0<br>416 PERLITE, 35.0 | 4308 PAE, 5.0<br>TEPA, 1.25 |
| 60 S CONTROL | KAMLOOPS - 26.3 | −250 CSF, 8.9 | 215 DE, 32.4<br>416 PERLITE, 32.4 | 1884 PAE, 1.5 |
| 60 S-1A, B, C | KAMLOOPS - 26.3 | −250 CSF, 8.9 | 215 DE, 32.4<br>416 PERLITE, 32.4 | 4308 PAE, 5.0<br>TEPA, 1.25 |
| 50 S CONTROL | KAMLOOPS - 21.0 | −250 CSF, 7.0 | 416 PERLITE, 36.0<br>436 PERLITE, 36.0 | 1884 PAE, 1.75 |
| 50 S-1A, B, C | KAMLOOPS - 21.0 | −250 CSF, 7.0 | 416 PERLITE, 36.0<br>436 PERLITE, 36.0 | 4308 PAE, 5.0<br>TEPA, 1.25 |
| 30 S CONTROL | KAMLOOPS - 23.6 | −250 CSF, 6.4 | 436 PERLITE, 70.0 | 1884 PAE, 1.9 |
| 30 S-1A, B, C | KAMLOOPS - 23.6 | −250 CSF, 6.4 | 436 PERLITE, 70.0 | 4308 PAE, 5.0<br>TEPA, 1.25 |

Sample filter medium sheets were prepared, using the Table 2 formulations, in the manner described in EXAMPLE 1 except that the dispersion pH before charge modifier addition, and after dilution to the final 2.0% consistency, were left "as-is". The resulting medium specific weights ranged from approximately 0.75 to 0.8 grams per square inch with sheet thicknesses of approximately 0.15 inch. The sample filter media of this EXAMPLE 2 were then subjected to the Metanil Yellow Dye Test previously described in EXAMPLE 1. The results of these tests are summarized in Table 3.

TABLE 3

| | METANIL YELLOW DYE TEST RESULTS | | | | |
|---|---|---|---|---|---|
| SAMPLE | INITIAL TRANSMITTANCE (%) | INITIAL P (PSID) | TIME (Min) | P (PSI) | FINAL TRANS- MITTANCE % |
| 90S CONTROL | 100.0 | 11.2 | 11.1 | 0.8 | 85.0 |
| 90S-1A | 97.0 | 8.5 | 48.8 | 5.0 | 90.0 |
| 90S-1B | 100.0 | 9.8 | 42.8 | 5.0 | 99.0 |
| 90S-1C | 99.0 | 13.1 | 30.5 | 5.0 | 99.0 |
| 60S CONTROL | 97.0 | 8.4 | 10.9 | 0.5 | 85.0 |
| 60S-1A | 99.0 | 8.2 | 35.3 | 5.0 | 91.0 |
| 60S-1B | 99.0 | 7.0 | 31.6 | 5.0 | 98.0 |
| 60S-1C | 98.0 | 8.0 | 46.8 | 5.0 | 94.0 |
| 50S CONTROL | 99.0 | 6.3 | 9.6 | 0.6 | 85.0 |
| 50S-1A | 100.0 | 5.5 | 53.9 | 5.0 | 96.0 |
| 50S-1B | 100.0 | 4.8 | 54.9 | 5.0 | 89.0 |
| 50S-1C | 100.0 | 4.8 | 41.2 | 5.0 | 99.0 |
| 30S CONTROL | 99.0 | 3.0 | 10.6 | 0.4 | 85.0 |
| 30S-1A | 100.0 | 2.3 | 13.3 | 5.0 | 100.0 |
| 30S-1B | 99.0 | 2.2 | 67.3 | 3.8 | 85.0 |
| 30S-1C | 99.0 | 2.0 | 73.7 | 2.7 | 85.0 |

A number of significant conclusions can be drawn from the results of Table 3, as follows:

1. The use of the high charge modifier content in the samples representative of the invention has no significant effect on the physical formation of the medium, or reduction in pore size, as demonstrated by the fact that the initial pressure drops (INITIAL P) exhibited by the samples of the invention are essentially identical to, or lower than, the initial pressure drops exhibited by the corresponding samples representative of the prior art.

2. The prior art samples exhibit low electrokinetic capture and adsorption capacities as demonstrated by the short time to breakthrough of the Metanil Yellow Dye (85.0% Final Transmittance) and the negligible increase in pressure drop across the sample medium ( P) during the course of the test.

3. The samples of the invention, on the other hand, exhibit unexpectedly high electrokinetic capture and adsorption capacities for the Metanil Yellow Dye as demonstrated by the significantly extended test time and the fact that all of the medium samples, with the exception of the most open (largest pore size) 30S - 1B and 30S - 1C samples, exhibited medium plugging ( P=5.0 PSID) prior to breakthrough of the Metanil Yellow Dye. In fact, most of the invention samples were still exhibiting significant electrokinetic capture and adsorption of the dye when the tests were terminated because of pad plugging.

EXAMPLE III

Using full scale production equipment, two different sheet filter medium samples were prepared as follows:

Sample Designation 60LZ

Formulation:
| | |
|---|---|
| WEYERHAUSER MAC WOOD PULP | 16.00 WT. PERCENT |
| −250 CSF REFINED MAC PUL | 24.00 WT. PERCENT |
| GREFCO DICALITE 215 DE | 30.00 WT. PERCENT |
| GREFCO DICALITE 416 PERLITE | 30.00 WT. PERCENT |
| HERCULES 4308 PAE RESIN | 5.00 WT. PERCENT |
| TETRAETHYLENE PENTAMINE | 1.25 WT. PERCENT |
| SHEET SPECIFIC WEIGHT | 0.763/0.842 GMS/IN$^2$ |

Sample Designation 90LZ

Formulation:
| | |
|---|---|
| WEYERHAUSER MAC WOOD PULP | 10.00 WT. PERCENT |
| −250 CSF REFINED MAC PUL | 18.00 WT. PERCENT |
| ACID WASHED GREFCO DICALITE 215 DE | 72.00 WT. PERCENT |
| HERCULES 4308 PAE RESIN | 5.00 WT. PERCENT |
| TETRAETHYLENE PENTAMINE | 1.25 WT. PERCENT |
| SHEET SPECIFIC WEIGHT | 0.763/0.842 GMS/IN$^2$ |

The process for preparing the sheet samples was essentially as described in EXAMPLE I except that the total weights and volumes of material were considerably higher and the sheet media were formed and vacuum dewatered on a semicontinuous foraminous former. Also, dispersion pH was left "as-is". These samples were subjected to a modified version of the Metanil Yellow Dye Tests as described in EXAMPLE I. The modifications were as follows:

| | |
|---|---|
| Test Sample Diameter | 118 mm |
| Test Flow Rate | 225 ml/min |
| Dye Concentration | 4.0 PPM |
| Inlet Transmittance | 43.7% |
| pH | 7.0 to 12.0 |

Standard ZETA PLUS 60S prior art medium was used in a comparative example. The results of this testing are summarized in Table 4.

TABLE 4

| SPECIFIC THRUPUT (Gal/Ft$^2$) | OUTLET TRANSMITTANCE (Percent) | | | | | | |
|---|---|---|---|---|---|---|---|
| | Prior Art | | | | | Invention | |
| | 60S | 60LZ | | | | 90LZ | |
| | pH 7.0 | pH 7.0 | pH 10.0 | pH 11.0 | pH 12.0 | pH 7.0 | pH 12.0 |
| 1.0 | 99.8 | 99.9 | 99.0 | 99.1 | 99.4 | 100.9 | 100.0 |
| 2.5 | 98.6 | 99.9 | 99.8 | 100.0 | 99.5 | 100.5 | 99.8 |
| 5.0 | 51.0 | 99.5 | 99.8 | 99.9 | 99.4 | 99.0 | 99.6 |
| 7.5 | — | 99.2 | 99.5 | 99.7 | 96.6 | 98.0 | 91.8 |
| 10.0 | — | 99.5 | 99.5 | 98.4 | 88.2 | 99.9 | 87.7 |
| 12.5 | — | 99.2 | 99.7 | 98.9 | 73.8 | 99.2 | 82.6 |
| 15.0 | — | 98.9 | 99.7 | 97.4 | — | 99.0 | 77.2 |

TABLE 4-continued

| SPECIFIC THRUPUT (Gal/Ft$^2$) | OUTLET TRANSMITTANCE (Percent) | | | | | | |
|---|---|---|---|---|---|---|---|
| | Prior Art | | | | Invention | | |
| | 60S | 60LZ | | | 90LZ | | |
| | pH 7.0 | pH 7.0 | pH 10.0 | pH 11.0 | pH 12.0 | pH 7.0 | pH 12.0 |
| 17.5 | — | 99.7 | 99.6 | 93.9 | — | 98.5 | — |
| 20.0 | — | 99.4 | 99.5 | 85.5 | — | 98.9 | — |
| 22.5 | — | 97.3 | 99.1 | 72.1 | — | 98.5 | — |
| 25.0 | — | 99.5 | 98.8 | — | — | 98.9 | — |
| 27.5 | — | 98.8 | 96.3 | — | — | 98.5 | — |
| 30.0 | — | 99.2 | 92.6 | — | — | 99.3 | — |
| 32.5 | — | 98.8 | 83.4 | — | — | 98.3 | — |
| 35.0 | — | 98.4 | 72.0 | — | — | 98.7 | — |
| 37.5 | — | 98.0 | — | — | — | 97.4 | — |
| 40.0 | — | 94.9 | — | — | — | 97.3 | — |
| 42.5 | — | 87.4 | — | — | — | 97.0 | — |
| 45.0 | — | 76.8 | — | — | — | 96.2 | — |
| 47.5 | — | — | — | — | — | 95.4 | — |
| 50.0 | — | — | — | — | — | 94.3 | — |
| 52.5 | — | — | — | — | — | 93.3 | — |
| 55.0 | — | — | — | — | — | 90.0 | — |
| 57.5 | — | — | — | — | — | 86.8 | — |
| 60.0 | — | — | — | — | — | 80.1 | — |
| 62.5 | — | — | — | — | — | — | — |

The test results in Table 4 demonstrate that the filter media of this invention demonstrate radically greater capacity for the electrokinetic adsorption of Metanil Yellow Dye than does the prior art media. At pH 7.0, the 60LZ exhibits a capacity 1200 percent greater, and the 90LZ exhibits a capacity 1600 percent greater, than the prior art 60S. More importantly, the filter media of this invention exhibit unexpected useful capacities at higher pH, up to and including 12.0, where the prior art media possess essentially no capacity. In fact, at pH 12.0, the 60LZ exhibits a capacity 200 percent greater, and the 90LZ exhibits a capacity 300 percent greater, than the prior art 60S is capable of achieving at pH 7.0.

EXAMPLE IV

The media of this invention (Sample Designation 60LZ as described in Example III) was fabricated into a 12 inch diameter, 15 cell cartridge of the general configuration shown in FIGS. 5 and 6. This cartridge was installed, in a suitable filter housing, in an industrial process water system in one of the Assignee's plants. This system suffered from pyrogen contamination of a form that had proven to be relatively intractable to useful reduction by means of prior art filter media. Specifically, this process water system attempted to convert municipal water into high purity pyrogen free water by means of sequential treatment through a carbon bed, an anion exchange bed, a ZETAPOR 020ST (0.2 micrometer) charge modified nylon membrane (Cuno, Inc., produced pursuant to U.S. Pat. No. 4,473,474 to Ostreicher et al) and ZETA PLUS 90LP (Cuno, Inc., produced pursuant to U.S. Pat. No, 4,606,824 to Chu et al). The pyrogen removal characteristics of this system, with newly installed prior art filter media, were typically as shown in Table 5.

TABLE 5

| SAMPLE DATE | INCOMING CITY WATER PYROGEN LEVEL (pg/ml) | pH | AFTER CARBON BED PYROGEN LEVEL (pg/ml) | pH | AFTER ANION EXCHANGER PYROGEN LEVEL (pg/ml) | pH | AFTER ZETAPOR 020ST PYROGEN LEVEL (pg/ml) | pH | AFTER ZETA PLUS 90LP PYROGEN LEVEL (pg/ml) | pH |
|---|---|---|---|---|---|---|---|---|---|---|
| 9/20/88 | 5200 | 7.2 | 2250 | 7.4 | <6400 | 7.3 | 1000 | 7.3 | <1600 | 7.1 |
| 9/21/88 | 5700 | 7.2 | <6400 | 7.3 | 5600 | 9.4 | 600 | 9.3 | <3200 | 8.8 |
| 9/22/88 | 5600 | 8.3 | 8800 | 7.3 | 4000 | 7.7 | 700 | 9.2 | 4800 | 9.4 |
| 9/23/88 | 4100 | 8.8 | 5200 | 7.7 | 5400 | 10.4 | 800 | 10.2 | 2700 | 10.4 |
| 9/27/88 | 8100 | 7.4 | 5600 | 7.3 | <12800 | 10.6 | <3200 | 10.5 | <6400 | 10.3 |

For the testing of the sample medium of this invention, the ZETAPOR 020ST cartridge was removed from the system and the prior art 90LP cartridge was replaced by the 60LZ sample medium cartridge representative of the invention. The results of these tests are summarized, in the form of 60LZ cartridge inlet and outlet pyrogen levels, pH, and total water processed, vs sample date, in Table 6.

The test results given in Tables 5 and 6 clearly demonstrate the superiority of the filter medium (60LZ) of this invention as compared to prior art filter media. The prior art charge modified nylon ZETAPOR 020ST membrane was capable of a pyrogen level reduction that averaged 83.3 percent. The prior art ZETA PLUS 90LP exhibited essentially no pyrogen removal. It is known that, in some applications, both prior art media are capable of useful and essentially quantitative levels of pyrogen removal from water. It would appear that, in the subject process water system used for these tests, the pyrogens are in a form that makes removal particularly difficult for the prior art media. This may be a function of the municipal water treatment methodology, the nature of the gram negative bacteria inhabiting the municipal or in-plant water distribution system, or the specific design of the subject process water treatment system. The media of this invention, on the other hand, exhibited an average pyrogen reduction of 97.3 percent over a period in excess of one month with a treated water total volume in excess of 85000 gallons.

TABLE 6

| SAMPLE | TOTAL WATER PROCESSED (GALLONS) | MEASURED INLET CONDITIONS | | MEASURED OUTLET CONDITIONS | |
|---|---|---|---|---|---|
| | | PYROGEN LEVEL | pH | PYROGEN LEVEL | pH |
| 12/20/88 | 603 | 3200 | 6.9 | <12.5 | 6.7 |
| 12/21/88 | 3947 | 2500 | 6.8 | <12.5 | 6.3 |
| 12/22/88 | 4498 | 1667 | 6.7 | <12.5 | 6.3 |
| 01/03/89 | 4666 | 20000 | 6.2 | 50.0 | 6.1 |
| 01/04/89 | 8913 | 1250 | 5.7 | 17.0 | 5.6 |
| 01/05/89 | 12772 | 2000 | 5.2 | 12.5 | 5.4 |
| 01/11/89 | 18248 | 2500 | 7.1 | 50.0 | 6.9 |
| 01/12/89 | 22488 | 5000 | 7.0 | 50.0 | 6.8 |
| 01/17/89 | 27178 | 1250 | 7.1 | 25.0 | 6.8 |
| 01/18/89 | 27178 | 1667 | 7.0 | 100.0 | 6.7 |
| 01/19/89 | 35081 | 1250 | 6.9 | 67.0 | 6.6 |
| 01/24/89 | 40528 | 1250 | 5.0 | 100.0 | 4.6 |
| 01/25/89 | 44541 | 1250 | 4.5 | 50.0 | 4.8 |
| 01/26/89 | 48616 | 2500 | 5.4 | 267.0 | 4.9 |
| 02/14/89 | 55509 | 1250 | 6.2 | 12.5 | 6.4 |
| 02/15/89 | 59218 | 1250 | 6.5 | 50.0 | 6.5 |
| 02/16/89 | 63145 | 1333 | 6.2 | <12.5 | 6.6 |
| 02/17/89 | 63145 | 1333 | 5.7 | 12.5 | 6.0 |
| 02/20/89 | 78507 | 1250 | 5.3 | 33.0 | 5.6 |
| 02/21/89 | 82033 | 500 | 5.8 | <12.5 | 5.7 |
| 02/22/89 | 85889 | 667 | 5.3 | <12.5 | 5.3 |
| 02/23/89 | — | 2000 | 5.2 | 12.5 | 5.3 |

EXAMPLE V

Five 10mm diameter discs of sample medium 60LZ of this invention (see EXAMPLE III) were installed, in a stacked series configuration, in a test housing which seals the outside edge of the medium disc stack and allows for pressurized flow of the challenge contaminant dispersion through the medium sample. The medium sample was equilibrated with 0.02M NaP + 0.15M NaCl pH 7.3 buffer solution. Using the same buffer solution, a 20000 pg/ml dispersion of E. coli LPS was prepared, and was flowed through the sample medium at a flow rate of 2.0 ml/min. Effluent fractions were collected at various times and assayed, in duplicate, for pyrogen (LPS) content by means of chromogenic substrate technique (Whittaker Bioproducts QLC-1000). The results were as summarized in Table 7.

straints, but it is evident that the sample medium was maintaining high efficiency for pyrogen removal at the end of the test and was certainly a long way from having exhausted its useful capacity.

EXAMPLE VI

Five 10 mm diameter discs of sample medium 60LZ (see EXAMPLE III) were installed, in a stacked series configuration, in a test housing which seals the outside edge of the medium disc stack and allows for pressurized flow of the challenge contaminant dispersion through the medium sample. Prior to installation in the test housing, the medium discs were washed with 1.0M NaOH, and then with 1.0M HCI, for 50 minutes each. After installation in the test housing, the medium sample was equilibrated with 0.02M NaP + 0.15M NaCl pH 7.3 buffer solution. 400 ml of the buffer containing 2.5 mg/ml HτG (Human Gamma Globulin) and 20000

TABLE 7

| DATE | CUMULATIVE VOLUME FILTERED (milliliters) | EFFLUENT PYROGEN CONCENTRATION (picograms/ml) | PYROGEN REMOVAL EFFICIENCY % |
|---|---|---|---|
| 01/12/89 | 270 | <100 | 99.5 |
| | 510 | <100 | <99.5 |
| | 720 | 177 | 99.1 |
| | 1000 | 267 | 98.7 |
| 01/13/89 | 1200 | <100 | <99.5 |
| | 1450 | <100 | <99.5 |
| | 1690 | 123 | 99.4 |
| | 1960 | 179 | 99.1 |
| 01/16/89 | 2160 | 363 | 98.2 |
| | 2420 | 519 | 97.4 |
| | 2710 | 576 | 97.1 |
| 02/18/89 | 3130 | 256 | 98.7 |
| | 3370 | 261 | 98.7 |
| | 3640 | 335 | 98.3 |
| 01/19/89 | 3940 | 496 | 97.5 |
| | 4300 | 687 | 96.6 |
| 01/20/89 | 4470 | 379 | 98.1 |
| | 4770 | 410 | 98.0 |
| | 4930 | 464 | 97.7 |

The data in Table 7 demonstrates the ability of the media of this invention to achieve useful (>1500 gallons/ft$^2$ at a specific flow rate of 0.62 gpm/ft$^2$) levels of depyrogenization in a highly contaminated buffer solution. The test was terminated because of time conpg/ml E. coli LPS was flowed through the sample medium at a flow rate of 2.0 ml/min. Effluent fractions were collected and assayed for HτG, and LPS content using the chromogenic technique (Whittaker Bioproducts QCL-1000). The results were as summarized in Table 8.

TABLE 8

| CUMULATIVE VOLUME FILTERED (milliliters) | EFFLUENT HrG CONCENTRATION (mg/ml) | EFFLUENT PYROGEN CONCENTRATION (pg/ml) |
|---|---|---|
| 20 | 1.90 | 800 |
| 40 | 2.40 | 2800 |
| 60 | 2.40 | 4200 |
| 80 | — | 6100 |
| 100 | 2.50 | 7100 |
| 140 | 2.50 | 9600 |
| 180 | — | 10700 |
| 220 | 2.50 | 11600 |
| 260 | — | 13400 |
| 300 | 2.50 | 15700 |
| 340 | — | 15800 |
| 400 | 2.50 | 17300 |

The above data demonstrates the ability of the media of this invention to achieve useful levels of depyrogenization in a highly contaminated protein solution, and to do so with minimal nonspecific protein binding.

EXAMPLE VII

The media of this invention (Samples 60LZ and 90LZ from EXAMPLE III) were tested, along with prior art 60 LP and 90LA media, to determine the gravimetric extraction levels in water. For each medium sample, the test consisted of inserting a 90mm disc of the sample medium into a polysulfone test housing, and recirculating 1.0 Litre of high purity (18 meg-ohm) water through the media sample for a period of 48 hours. At the end of that time, a 500 ml sample of the water was placed in a preweighed beaker and boiled to dryness and reweighed to determine the total weight extraction. The beaker, containing the dried extraction residue, was then placed in a muffle furnace overnight at a temperature of 550° C., to remove the organic portion of the residue. After cooling the beaker containing the inorganic residue was reweighed to determine the inorganic weight extraction. The organic weight extraction was then calculated by subtracting the inorganic from the total. The results, adjusted back to the full 1 liter water extraction volume, are summarized in Table 9.

TABLE 9

| SAMPLE | CHARGE MODIFIER | CHARGE MODIFIER (Wt. %) | TOTAL EXTRACTION (mg) | ORGANIC EXTRACTION (mg) |
|---|---|---|---|---|
| 60LP | 1884 PAE RESIN | 1.90 | 8.3 | 3.2 |
| 60LZ | 4308 PAE RESIN TEPA | 5.00 | 9.5 | 5.6 |
| 90LA | 1884 PAE RESIN | 1.90 | 11.4 | 8.0 |
| 90LZ | 4308 PAE RESIN TEPA | 5.00 | 20.2 | 9.5 |

Both the prior art media and the media of this invention exhibited extremely low gravimetric extractions when subjected to extended water contact. Given an average sample medium weight of approximately 7.4 grams, the organic extractions represent less than 0.13 percent of the sample weight. The media of this invention exhibit these very low, and essentially equivalent, organic extraction levels in spite of their significantly higher level of charge modifier.

What is claimed:

1. A filter media comprising filter elements of cellulose fiber and silica based particulate or fiber and a charge modifying amount of a cationic charge modifying system bonded to surfaces of the elements, the system comprising:

a primary charge modifying agent which is a water soluble organic polymer capable of being adsorbed onto the elements and having a molecular weight of greater than about 1000, each monomer of the polymer having at least one epoxide group capable of bonding to the surfaces of the elements and quaternary ammonium groups;

and a secondary charge modifying agent bonded to a portion of the epoxy groups on the organic polymer, wherein said secondary charge modifying agent is an aliphatic polyamine having at least one primary amine or at least two secondary amines.

2. The filter media of claim 1, comprising a filter sheet of cellulosic fibrous elements and particulate filter elements.

3. The filter media of claim 1, wherein the secondary charge modifying agent has the formula:

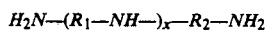

$$H_2N-(R_1-NH-)_x-R_2-NH_2$$

wherein $R_1$ and $R_2$ are alkyl of 1 to 4 carbon atoms and x is an integer from 0 to 4.

4. The filter media of claim 3, wherein $R_1$ and $R_2$ are both ethyl.

5. The filter media of claim 1, wherein the polyamine is selected from ethylene diamine, diethylene triamine, triethylene tetramine and tetraethylene pentamine.

6. The filter media of claim 1, wherein the polyamine is tetraethylene pentamine.

7. The filter media of claim 1, comprising filter elements of particulate immobilized in a porous matrix of cellulose fibers.

8. The filter media of claim 7, wherein the cellulose fibers are highly purified alpha-cellulose.

9. The filter media of claim 7, comprising at least 50% by weight of particulate filter elements.

10. The filter media of claim 9, wherein the particulate filter elements are selected from the group consisting of diatomaceous earth, perlite and mixtures thereof.

11. A filter media comprising filter elements of cellulose fiber and silica based particulate or fiber and a charge modifying amount of a cationic charge modifying system bonded to surfaces of the elements, the system comprising:

a primary charge modifying agent which is a water soluble organic polymer capable of being adsorbed onto the elements and having a molecular weight of greater than about 1000, wherein the organic polymer is a polyamido-polyamine epichlorohydrin resin, having epoxide groups capable of bonding to the surfaces of the elements and quaternary ammonium groups;

and a secondary charge modifying agent bonded to a portion of the epoxy groups on the organic polymer, wherein said secondary charge modifying agent is an aliphatic polyamine having at least one primary amine or at least two secondary amines.

12. A filter media comprising filter elements of cellulose fiber and silica based particulate or fiber and a charge modifying amount of a cationic charge modifying system bonded to surfaces of the elements, the system comprising:
a primary charge modifying agent which is a water soluble organic polymer capable of being adsorbed onto the elements and having a molecular weight of greater than about 1000, wherein the organic polymer is a polyamine epichlorohydrin resin, having epoxide groups capable of bonding to the surfaces of the elements and quaternary ammonium groups;
and a secondary charge modifying agent bonded to a portion of the epoxy groups on the organic polymer, wherein said secondary charge modifying agent is an aliphatic polyamine having at least one primary amine or at least two secondary amines.

13. A filter media comprising filter elements of cellulose fiber and silica based particulate or fiber and a charge modifying amount of a cationic charge modifying system bonded to surfaces of the elements, the system comprising:
a primary charge modifying agent which is a water soluble organic polymer capable of being adsorbed onto the elements and having a molecular weight of greater than about 1000, wherein the organic polymer is a resin based upon diallylnitrogen-containing materials reacted with epichlorohydrin, having epoxide groups capable of bonding to the surfaces of the elements and quaternary ammonium groups;
and a secondary charge modifying agent bonded to a portion of the epoxy groups on the organic polymer, wherein said secondary charge modifying agent is an aliphatic polyamine having at least one primary amine or at least two secondary amines.

14. A filter media comprising filter elements of cellulose fiber and silica based particulate or fiber and a charge modifying amount of a cationic charge modifying system bonded to surfaces of the elements, the system comprising:
a primary charge modifying agent which is a water soluble organic polymer capable of being adsorbed onto the elements and having a molecular weight of greater than about 1000, wherein the organic polymer is the reaction product of a polyamine with epichlorohydrin, said product having along the polyamine chain
(i) quaternary ammonium groups, and
(ii) epoxide groups capable of bonding to the surface of the filter elements
and a secondary charge modifying agent bonded to a portion of the epoxy groups on the organic polymer, wherein said secondary charge modifying agent is an aliphatic polyamine having at least one primary amine or at least two secondary amines.

15. A process for preparing a charge modified filter media comprising filter elements of cellulosic fiber and silica based particulate or fiber comprising:
applying to the filter elements a charge modifying system comprising:
a primary charge modifying agent which is a water soluble organic polymer capable of being adsorbed onto the elements and having a molecular weight of greater than about 1000, each monomer of the polymer having at least one epoxide group capable of bonding to surfaces of the elements and quaternary ammonium groups; and
a secondary charge modifying agent which is an aliphatic polyamine having at least one primary amine or at least two secondary amines.

16. The process of claim 15, comprising (a) contacting the filter elements with an aqueous solution of the primary cationic charge modifying agent and (b) contacting the filter elements with an aqueous solution of the secondary charge modifying agent.

17. The process of claim 16, wherein the contacting steps are performed simultaneously.

18. The process of claim 17, wherein the contacting steps are performed by contacting the filter elements with an aqueous solution of a mixture of the primary charge modifying agent and the secondary charge modifying agent to form an aqueous composition.

19. The process of claim 18, further comprising vacuum felting and drying the aqueous composition.

20. The process of claim 16, wherein the aqueous solution of primary charge modifying agent is at least about 1% primary charge modifying agent by weight of the filter elements.

21. The process of claim 20, wherein the aqueous solution of primary charge modifying agent does not exceed about 5% primary charge modifying agent by weight of the filter elements.

22. The process of claim 16, wherein the secondary charge modifying agent is present in amount sufficient to form a ratio of primary to secondary charge modifying agent of from about 1:1 to about 10:1, by weight.

23. The process of claim 22, wherein the ratio is about 3:1 to about 6:1, by weight.

24. The process of claim 16, wherein the aqueous solution of secondary charge modifying agent contains about 0.2% to about 0.5% secondary charge modifying agent by weight of the filter elements.

25. The process of claim 15, wherein the secondary charge modifying agent is tetraethylene pentamine.

26. A process for preparing a charge modified filter media comprising filter elements of cellulosic fiber and silica based particulate or fiber comprising:
applying to the filter elements a charge modifying system comprising:
a primary charge modifying agent which is a water soluble organic polymer capable of being adsorbed onto the elements and having a molecular weight of greater than about 1000, wherein the organic polymer is a polyamido-polyamine epichlorohydrin resin having epoxide groups capable of bonding to the surfaces of the elements and quaternary ammonium groups; and
a secondary charge modifying agent which is an aliphatic polyamine having at least one primary amine or at least two secondary amines.

27. A process for preparing a charge modified filter media comprising filter elements of cellulosic fiber and silica based particulate or fiber comprising:
applying to the filter elements a charge modifying system comprising:
a primary charge modifying agent which is a water soluble organic polymer capable of being adsorbed onto the elements and having a molecular weight of greater than about 1000, wherein the organic polymer is a polyamine epichlorohydrin resin, having epoxide groups capable of bonding to the surfaces of the elements and quaternary ammonium groups; and a secondary charge modifying agent which is an aliphatic polyamine having at least one primary amine or at least two secondary amines.

28. A process for preparing a charge modified filter media comprising filter elements of cellulosic fiber and silica based particulate or fiber comprising:

applying to the filter elements a charge modifying system comprising:

a primary charge modifying agent which is a water soluble organic polymer capable of being adsorbed onto the elements having a molecular weight of greater than about 1000, wherein the organic polymer is a resin based upon diallylnitrogen-containing materials reacted with epichlorohydrin, having epoxide groups capable of bonding to the surfaces of the elements and quaternary ammonium groups; and a secondary charge modifying agent which is an aliphatic polyamine having at least one primary amine or at least two secondary amines.

29. A process for preparing a charge modified filter media comprising filter elements of cellulosic fiber and silica based particulate or fiber comprising:

applying to the filter elements a charge modifying system comprising:

a primary charge modifying agent which is a water soluble organic polymer capable of being adsorbed onto the elements having a molecular weight of greater than about 1000, wherein the resin is a reaction product of a polyamine with epichlorohydrin, said product having along the polyamine chain (i) quaternary ammonium groups, and
(ii) epoxide groups capable of bonding to the surfaces of the filter elements and a secondary charge modifying agent which is an aliphatic polyamine having at least one primary amine or at least two secondary amines.

* * * * *